UNITED STATES PATENT OFFICE.

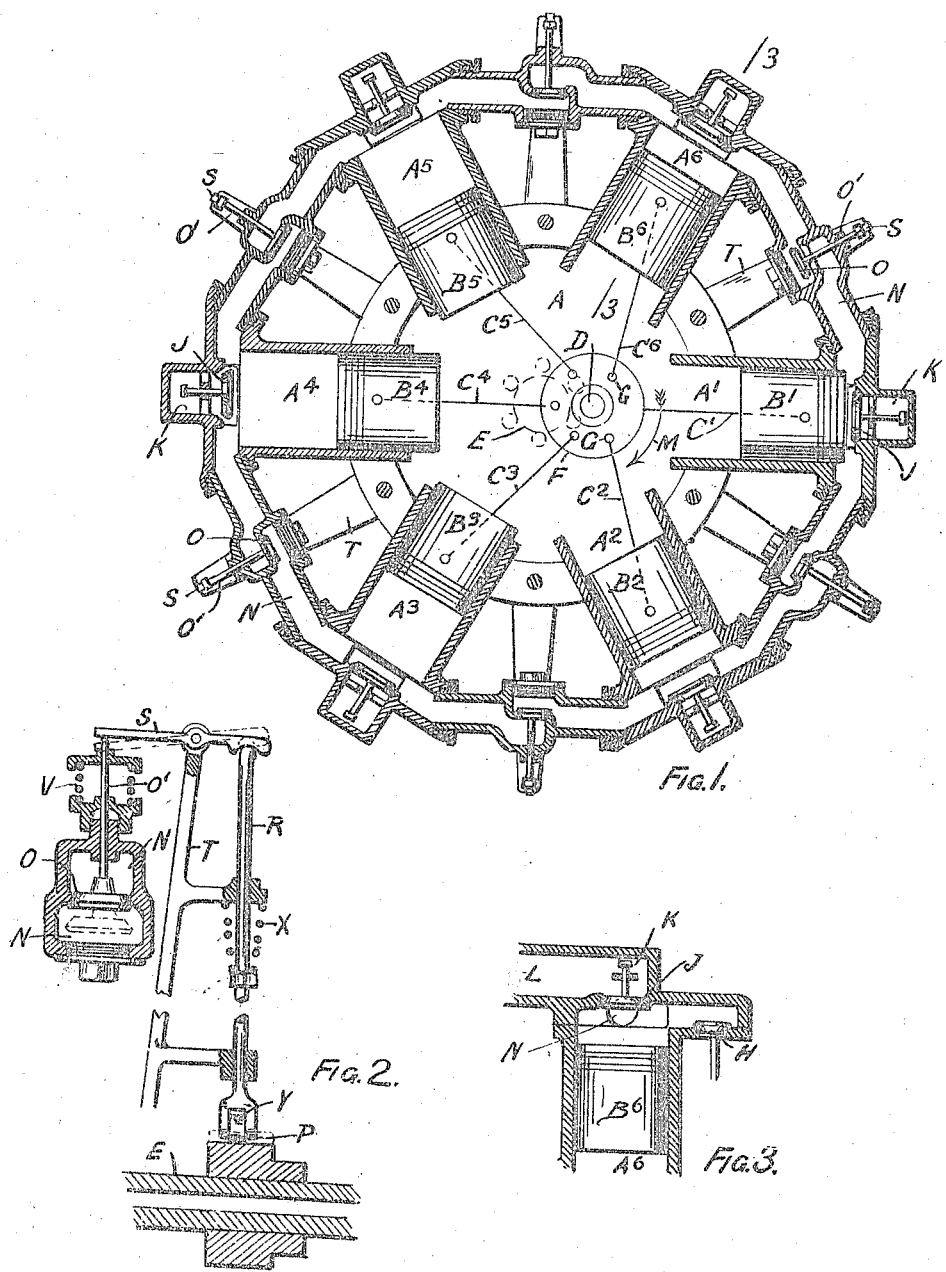

ARCHIBALD NEWTON WESLEY RICHARDSON, OF SYDNEY, NEW SOUTH WALES, AUSTRALIA.

MULTICYLINDER INTERNAL-COMBUSTION ENGINE.

1,269,858.  Specification of Letters Patent.  Patented June 18, 1918.

Application filed July 23, 1917.  Serial No. 183,347.

*To all whom it may concern:*

Be it known that I, ARCHIBALD NEWTON WESLEY RICHARDSON, a subject of the King of Great Britain and Ireland, residing at Marton, Roscoe street, Bondi, Sydney, in the State of New South Wales, Commonwealth of Australia, have invented certain new and useful Improvements in Multicylinder Internal-Combustion Engines, of which the following is a specification.

The object of this invention is to effect certain improvements in multi-cylinder internal combustion engines whereby greater efficiency is obtained.

In internal combustion engines the ignition of the charge occurs when the crank is at or about the dead center with the result that the maximum pressure on the piston takes place when the connecting rod is at an acute angle to the center line and the turning effort on the crank shaft is almost at the minimum, thus militating against efficiency.

And this invention consists in reinforcing the exploded charge in one cylinder after the piston has traveled a certain distance, by the admission of part of the charge fired in the next succeeding cylinder in firing sequence, so that additional pressure is applied to the piston of the first mentioned at a time when the crank is at a greater angle and the turning effort is greater than when at or about the dead center, thus increasing the efficiency; and in the means for effecting such reinforcement of the charge in each cylinder in succession.

In engines in which the cylinders are disposed radially to the crank shaft, the desired object is obtained by providing valve controlled communication between each cylinder and the next succeeding cylinder in firing sequence, said valve being actuated and timed by a cam device or other known mechanical means operated by any suitable moving part of the engine.

The invention will be further explained by reference to the accompanying drawings which depict diagrammatically a two-cycle multi-cylinder engine having fixed cylinders radially disposed about a central crank shaft, and embodying my invention.

In the drawings:—

Figure 1 is a sectional elevation through the firing cylinders of a two cycle multi-cylinder engine, the compression cylinders or other charge compressing means not being shown, they forming no part of this invention. Fig. 2 is a sectional elevation showing an arrangement of gear for controlling the valves between the cylinders, and Fig. 3 is a sectional elevation on line 3, 3, of Fig. 1.

The engine has six cylinders $A^1$, $A^2$, $A^3$, $A^4$, $A^5$ and $A^6$ radially disposed about a crank case A and fitted respectively with pistons $B^1$, $B^2$, $B^3$, $B^4$, $B^5$ and $B^6$, having connecting rods $C^1$, $C^2$, $C^3$, $C^4$, $C^5$ and $C^6$ all operating on a common crank pin D on shaft E. One of said connecting rods, as for example $C^1$, is a master rod rigidly connected to a pair of disks F mounted on the crank pin D and the other rods are pivoted between said disks as at G, G. This arrangement of connecting rods is known.

Each cylinder has an exhaust valve H (see Fig. 3), and an inlet valve J in a housing K, communicating with a passage L through which the fuel charge to each cylinder is conveyed from the charge compressing means (not shown). The inlet and exhaust valves may be mechanically operated or otherwise—in either case as in known practice.

The engine is arranged and adapted to run clockwise as indicated by the arrow M, and each cylinder is connected to the next in firing sequence by a pipe N in which is a mechanically operated valve O normally closing the passage. Each valve O has a stem $O^1$ and is opened by a cam P on shaft E through a rod R and lever S pivoted on a standard T. A spring V serves to return the valve O to its seat, and a spring X maintains the roller Y on the end of rod R in contact with the cam P.

The cams P are so disposed relatively to the crank D that each operates to momentarily open its respective valve O at or about the time of firing of the next cylinder in firing sequence, as for example the valve O between cylinders $A^1$ and $A^6$ is opened at the time of firing of cylinder $A^1$ so that the pressure therein is partly transferred to cylinder $A^6$ to reinforce the now reduced pressure in the latter and act upon the piston $B^6$ when its connecting rod and crank are in an advantageous position in regard to the turning effort on the shaft E. By the same means the enormous initial pressure in any cylinder at the time of ignition is partially relieved.

In a four cycle engine the timing arrangement of the gear for operating the valves in the passages connecting the cylinders would obviously be suitably modified.

What I claim as my invention is:—

1. An explosive engine comprising a plurality of cylinders, reciprocating pistons therein, a crank shaft to which the pistons are secured, a pipe connecting each of said cylinders to the next one in firing sequence, valves in said pipe, and means for reinforcing the exploded charge in one cylinder by the admission thereto of part of the charge fired in the next succeeding cylinder in firing sequence.

2. An explosive engine comprising a plurality of cylinders, reciprocating pistons therein, a crank shaft to which the pistons are secured, means for connecting each of said cylinders to the next one in firing sequence, valves within the means for connecting said cylinders and timed means for actuating said valves, and means for reinforcing the exploded charge in each cylinder by the admission thereto of part of the charge fired in the next succeeding cylinder in firing sequence.

3. An explosive engine comprising a plurality of cylinders, reciprocating pistons therein, a crank shaft to which the pistons are secured, a pipe connecting each of said cylinders to the next one in firing sequence, valves in said pipes, timed means for actuating said valves, cams on the crank shaft, and means interposed between said cams and valves whereby the latter are actuated, substantially as described.

4. In a multi-cylinder internal combustion engine, a central shaft, cylinders radially disposed about said shaft, valve controlled communication between each cylinder and the next succeeding cylinder in firing sequence, cams on said shaft, and a rod and lever mechanism whereby said valves are actuated by said cams, substantially as described.

5. In multi-cylinder two-cycle internal combustion engines, a central crank shaft, firing cylinders disposed radially about said crank shaft, pistons in said cylinders, connecting rods between said pistons, a common crank valve controlled communication between each of said cylinders and the next succeeding cylinder in firing sequence, cams on said shaft, and mechanical means whereby said valves are actuated by said cams, substantially as described.

Signed at Sydney, in the State of New South Wales, Australia, this second day of July, A. D. 1917.

ARCHIBALD NEWTON WESLEY RICHARDSON.

Witnesses:
 WM. NEWTON,
 Y. V. RICHARDSON.